(12) United States Patent
Kim

(10) Patent No.: US 11,702,071 B2
(45) Date of Patent: Jul. 18, 2023

(54) VEHICLE CONTROL METHOD OF AUTONOMOUS VEHICLE FOR RIGHT AND LEFT TURN AT THE CROSSROAD

(71) Applicants: HYUNDAI MOTOR COMPANY, Seoul (KR); KIA MOTORS CORPORATION, Seoul (KR)

(72) Inventor: In-Su Kim, Anyang-si (KR)

(73) Assignees: Hyundai Motor Company, Seoul (KR); Kia Motors Corporation, Seoul (KR)

(\*) Notice: Subject to any disclaimer, the term of this patent is extended or adjusted under 35 U.S.C. 154(b) by 171 days.

(21) Appl. No.: 17/197,521

(22) Filed: Mar. 10, 2021

(65) Prior Publication Data
US 2022/0118972 A1 Apr. 21, 2022

(30) Foreign Application Priority Data
Oct. 16, 2020 (KR) .................. 10-2020-0134445

(51) Int. Cl.
*B60W 30/095* (2012.01)
*G05D 1/02* (2020.01)
*B60W 30/09* (2012.01)
*G08G 1/0967* (2006.01)
*B60L 7/00* (2006.01)

(52) U.S. Cl.
CPC ........ *B60W 30/0956* (2013.01); *B60W 30/09* (2013.01); *G05D 1/021* (2013.01); *G08G 1/096725* (2013.01); *G08G 1/096791* (2013.01); *B60L 7/00* (2013.01); *B60W 2552/05* (2020.02); *B60W 2552/53* (2020.02); *B60W 2554/4041* (2020.02); *B60W 2554/4042* (2020.02); *B60W 2554/4045* (2020.02); *B60W 2556/45* (2020.02); *B60W 2720/106* (2013.01)

(58) Field of Classification Search
None
See application file for complete search history.

(56) References Cited

U.S. PATENT DOCUMENTS

| 9,475,491 B1 | 10/2016 | Nagasaka et al. | |
| 2020/0380870 A1* | 12/2020 | Eguchi | .................. G05D 1/101 |
| 2021/0188275 A1* | 6/2021 | Matsumura | ........... B60W 30/16 |

FOREIGN PATENT DOCUMENTS

KR    10-2019-0069962    6/2019

\* cited by examiner

*Primary Examiner* — Maceeh Anwari
*Assistant Examiner* — Charles Pall
(74) *Attorney, Agent, or Firm* — Fox Rothschild LLP

(57) ABSTRACT

A vehicle control method of an autonomous vehicle for a right and left turn at a crossroad includes: determining whether a second vehicle intends to change a lane while passing a front or a rear of a first vehicle in order to move to a target lane for the right and left turn at the crossroad; controlling the first vehicle to decelerate when it is determined that the second vehicle intends to change the lane while passing the front of the first vehicle; determining whether the second vehicle is entering the first lane toward the front or the rear of the first vehicle; calculating a steering amount of the second vehicle when it is determined that the second vehicle is entering the first lane toward the front of the first vehicle; and controlling the first vehicle to decelerate according to the steering amount.

11 Claims, 4 Drawing Sheets

VEHICLE CONTROL METHOD OF AUTONOMOUS VEHICLE FOR RIGHT AND LEFT TURN AT THE CROSSROAD

CROSS-REFERENCE TO RELATED APPLICATION

The present application claims priority to and the benefit of Korean Patent Application No. 10-2020-0134445, filed on Oct. 16, 2020, the disclosure of which is incorporated herein by reference in its entirety.

TECHNICAL FIELD

The present disclosure relates to a vehicle control method of an autonomous vehicle for a right and left turn at the crossroad.

BACKGROUND

An autonomous vehicle is a vehicle which recognizes a driving environment, determines a risk, and plans a driving route without direct operation by a driver to minimize a driver driving operation and autonomously performs safe driving.

Meanwhile, while the autonomous vehicle and a surrounding vehicle are driven on different lanes at a crossroad entrance road, there is a case where the surrounding vehicle changes the lane for the right and left turn at the crossroad. In this case, when the surrounding vehicle changes the lane while passing through a front or a rear of the main vehicle, if an appropriate control strategy is not established, there is a possibility that a collision between the vehicles will occur.

SUMMARY

The present disclosure provides a different type of disclosure which can establish an appropriate control strategy in order to prevent an accident between vehicles when a vehicle which is driven separated from a main vehicle by two lanes or more on a crossroad entrance road changes a lane in order to turn at the crossroad.

An exemplary embodiment of the present disclosure provides a vehicle control method of an autonomous vehicle for a right and left turn at the crossroad, which includes: a determination step of determining whether a second vehicle which is driven separated from a first lane of a first vehicle by two lanes or more intends to change a lane while passing a front or a rear of the first vehicle in order to move to a target lane for the right and left turn at the crossroad; a first control step of controlling to decelerate the first vehicle when it is determined that the second vehicle which intends to change the lane up to the target lane passes the front of the first vehicle; a determination step of determining whether the second vehicle is entering the first lane toward the front or the rear of the first vehicle; a calculation step of calculating a size of a steering amount of the second vehicle for changing the lane up to the target lane when it is determined that the second vehicle is entering the first lane toward the front of the first vehicle; and a second control step of controlling to decelerate the first vehicle according to the size of the steering amount.

According to an exemplary embodiment of the present disclosure, when a surrounding vehicle which is driven separated from a main vehicle by two lanes or more at a crossroad entrance road passes the main vehicle for a lane change, the surrounding vehicle can safely perform the lane change to a target lane by using various sensors mounted on the main vehicle, IoT, and V2V technology.

According to an exemplary embodiment of the present disclosure, when it is expected that the surrounding vehicle passes a front of the main vehicle, the main vehicle is previously decelerated to prevent a collision accident between the vehicles and regenerative braking is performed during deceleration, thereby enhancing fuel efficiency.

According to an exemplary embodiment of the present disclosure, it is determined whether the surrounding vehicle is suddenly steered while the surrounding vehicle enters the front of the main vehicle to control a deceleration size of the main vehicle.

DRAWINGS

DETAILED DESCRIPTION

Hereinafter, preferred embodiments of a vehicle control method of an autonomous vehicle for a right and left turn at the crossroad according to the present disclosure will be described in detail with reference to drawings. Terms or words used hereinafter should not be interpreted as being limited to ordinary or lexical meanings and should be interpreted as meanings and concepts which match the technical spirit of the present disclosure based on a principle in which the inventor can appropriately define concepts of the terms in order to describe his/her disclosure by the best method.

(Related Art 1) Korean Patent Application Laid-Open No. 10-2019-0069962 (Autonomous Vehicle and Method for Changing Traveling Lane) includes a lane change determining step of determining a lane change, a lane change intention notifying step of changing a driving position in the lane before the change when the lane change is determined and notifying a lane change intention to the surrounding vehicle by maintaining a set time or distance, and a lane changing step of driving and moving the vehicle to a lane to be changed after the set time or distance elapsed.

(Related Art 2) U.S. Pat. No. 9,475,491 (LANE CHANGING FOR AUTONOMOUS VEHICLES) relates to a control method of identifying an interval between a pair of neighboring vehicles located on a lane adjacent to a current driving lane of the autonomous vehicle by using a vehicle sensor and attempting the lane change by the interval.

However, Related Arts 1 and 2 cannot be adopted as a technology for controlling the main vehicle according to an intention of the vehicle which changes the lane at the crossroad entrance road and in particular, are not appropriate as a lane change control method of a vehicle which is driven separated by two lanes or more rather than a one-lane change.

Figure 1:
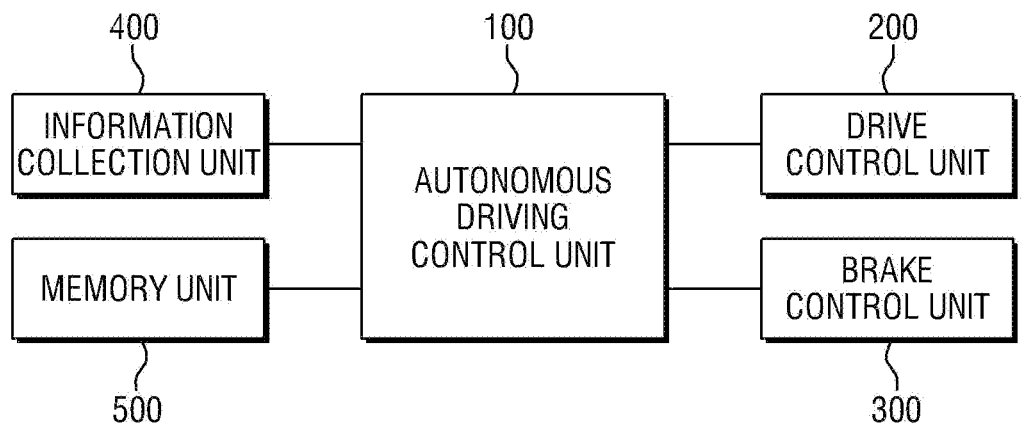
FIG. 1 is a diagram schematically illustrating a component required for a vehicle control method of an autonomous vehicle for a right and left turn at the crossroad in one form of the present disclosure.

FIG. 1 is a diagram schematically illustrating a component required for a vehicle control method of an autonomous vehicle for a right and left turn at the crossroad in some forms of the present disclosure.

Referring to FIG. 1, components for implementing the vehicle control method of an autonomous vehicle for a right and left turn at the crossroad in some forms of the present disclosure include an autonomous driving control unit 100, a drive control unit 200, a brake control unit 300, an information collection unit 400, and a memory unit 500. Respective components may be modulated and separated, and a control function and a communication function may be performed by an electronic control unit separately installed for each control unit included in each system or a function of each control unit may be performed by one ECU. Such an ECU module may be provided as one or more processors which are operated by a set program or is configured to perform each step of an operation method to be described below.

The autonomous driving control unit 100 autonomously determines a target driving route by recognizing a surrounding environment with an internal/external information sensing and processing function by the information collection unit 400 while driving without controlling a brake, a handle, an accelerator pedal, etc., by a driver.

The drive control unit 200 transmits a control signal to a motor or an engine according to an acceleration request signal of the autonomous driving control unit 100. The brake control unit 300 transmits a control signal to generate a regenerative braking force controlled by a braking controller and/or friction braking by hydraulic pressure according to a deceleration request signal of the autonomous driving control unit 100.

The information collection unit 400 collects internal vehicle information and external vehicle information. Here, the internal vehicle information means information collected by various sensors capable of determining an internal vehicle state, e.g., a wheel speed sensor, a yaw rate sensor, a steering angle sensor, a transverse acceleration sensor, etc. The external vehicle information means information collected by various sensors capable of determining an external vehicle state, e.g., RADAR, LIDAR, an image sensor, a GPS, a navigation, an Internet of Things (IoT) module, vehicle-to-vehicle (V2V), etc.

The memory unit 500 stores the internal vehicle information and the external vehicle information collected by the information collection unit 400 and provides information required for a computation process of the autonomous driving control unit 100.

Figure 2:
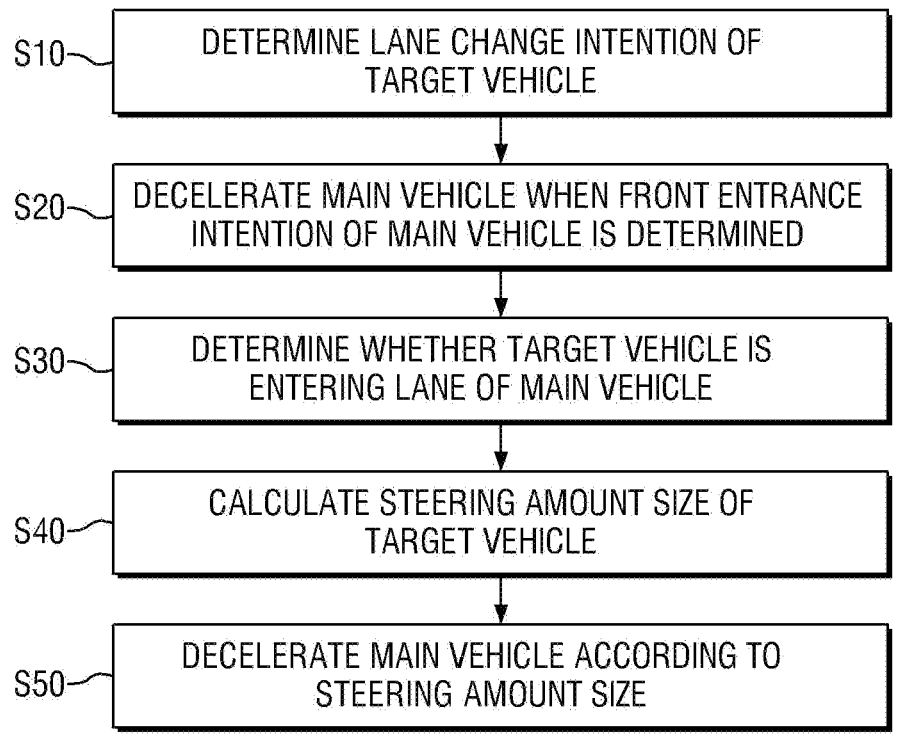
FIG. 2 is a diagram illustrating a schematic step of a vehicle control method of an autonomous vehicle for a right and left turn at the crossroad in one form of the present disclosure.
Figure 3:
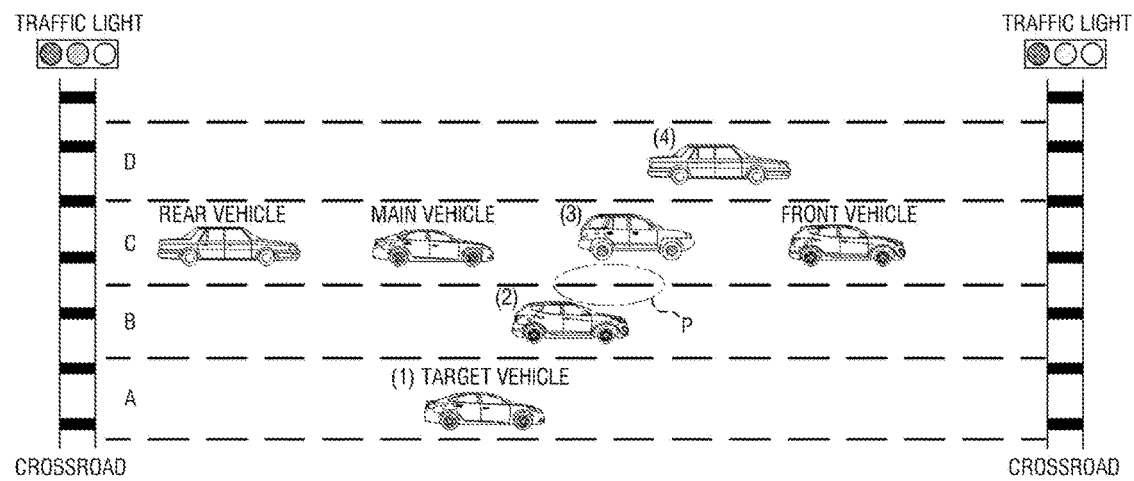
FIG. 3 is a diagram illustrating driving states of a main vehicle and a surrounding vehicle at a crossroad entrance road in one form of the present disclosure.
Figure 4:
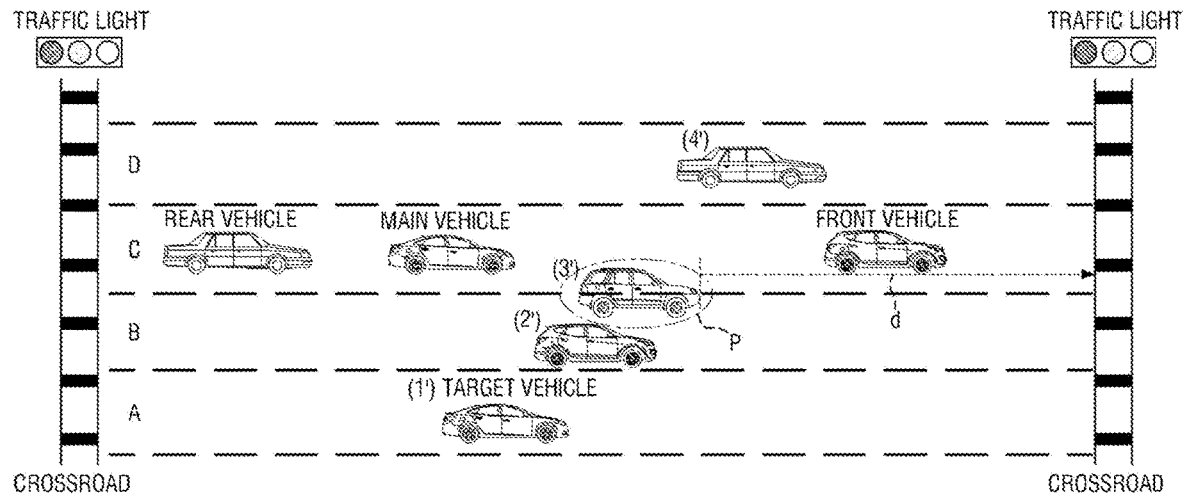
FIG. 4 is a diagram illustrating a state in which a surrounding vehicle enters a lane of a main vehicle at a crossroad entrance road in one form of the present disclosure.

FIG. 2 is a diagram illustrating a schematic step of a vehicle control method of an autonomous vehicle for a right and left turn at the crossroad in some forms of the present disclosure, FIG. 3 is a diagram illustrating driving states of a main vehicle and a surrounding vehicle at a crossroad entrance road in some forms of the present disclosure, and FIG. 4 is a diagram illustrating a state in which a surrounding vehicle enters a lane of a main vehicle at a crossroad entrance road in some forms of the present disclosure.

The present disclosure relates to a control method of a main vehicle when a surrounding vehicle changes a lane while passing the lane of the main vehicle for the right and right turn at the crossroad in the case where the surrounding vehicle is driven on a lane separated from the lane on which the main vehicle is driven by two lanes or more at the crossroad entrance road.

The present disclosure may be applied to a case where the surrounding vehicle changes the lane up to a target lane by passing a front or rear of the main vehicle when the surrounding vehicle is driven separated from the main vehicle by two lanes or more and is not applied to a case where the surrounding vehicle does not influence a change of a vehicle speed of the main vehicle while changing the lane.

A situation in a crossroad entrance road to which the present disclosure may be applied will be described below. Referring to FIG. 3, the crossroad entrance road is located between the crossroad located in the rear and the crossroad located in the front based on a driving direction of the main vehicle. In this case, the crossroad located in the rear may be not present. Four lanes A, B, C, and D in FIG. 3 divided by the traffic line is illustrated on the crossroad entrance road of FIG. 3. However, if the main vehicle and the surrounding vehicle may be separated from each other by two lanes or more, there is no limit in the number of lanes.

On lane C, the main vehicle, a front vehicle located in the front of the main vehicle, and a rear vehicle located in the rear of the main vehicle are being driven. On lane A, the surrounding vehicle changes the lane to the target lane D for the left turn at the crossroad while being driven. Here, the surrounding vehicle which intends to pass through the front or the rear of the main vehicle while changing two lanes or more is defined as a target vehicle in in some forms of the present disclosure. In FIG. 3, a process (1-2-3-4) in which the target vehicle changes the lane from driving lane A to target lane D is illustrated. However, the present disclosure may be naturally applied even to a case where the target vehicle is driven on lane D and changes the lane to the target lane A for the right turn at the crossroad.

According to the driving states of the main vehicle and the target vehicle in the crossroad entrance road, the following step is performed in the vehicle control method of the autonomous vehicle for the right and left turn at the crossroad in some forms of the present disclosure. In this case, a main control of each step is performed by the autonomous driving control unit 100 of the main vehicle.

Referring to FIG. 2, first, a step in which a main vehicle determines a lane change intention of a target vehicle is performed (S10). This is a step of determining whether the target vehicle which is driven separated from the main vehicle by two lanes or more intends to change a lane to a target lane by passing the main vehicle for the right and left turn.

The autonomous driving control unit 100 determines the number of lanes of the crossroad entrance road, a straight lane, the target lane in the right and left turn, etc., by using various sensors mounted on the main vehicle before determining the lane change intention of the target vehicle. In some forms of the present disclosure, the autonomous driving control unit 100 may determine each lane information by using the navigation, and additionally dually confirm lane information by using sensors including a camera, an ultrasonic sensor, a radar, and a LIDAR mounted on the main vehicle and then correct navigation information.

The autonomous driving control unit 100 may determine the lane change intention of the target vehicle, whether the target vehicle passes the front or rear of the main vehicle, etc., based on the information collected by the information collection unit 400. For example, the main vehicle and the target vehicle as connected cars may share driving information with each other by using the technology such as IoT, V2V, etc., and as a result, the main vehicle receives the lane change information from the target vehicle to determine the lane change intention of the target vehicle.

Referring to FIG. 2, next, when it is determined that the target vehicle intends to enter the front of the main vehicle, a step of decelerating the main vehicle is performed (S20). The target vehicle may pass through the front or rear of the main vehicle for the lane change, and this step is a control step of a case where it is determined that the target vehicle passes the front of the main vehicle. Of course, in this step, the target vehicle is not in a state of entering the lane of the main vehicle. Accordingly, referring to FIG. 3, the main vehicle may determine whether the target vehicle intends to enter the front of the main vehicle until moving to a neighboring lane B of the main vehicle from a first driving lane A. In this case, the autonomous driving control unit 100 may receive the driving information of the target vehicle by using the V2V technology or receive the driving state information of the target vehicle by using the sensor mounted on the main vehicle. Further, the autonomous driving control unit 100 receives traffic information in the crossroad entrance road by using the IoT technology to determine whether the target vehicle intends to enter the front of the main vehicle.

When it is determined that the target vehicle passes the front of the main vehicle, the autonomous driving control unit 100 transmits a control signal for decelerating the main vehicle to the brake control unit 300. In this case, the brake control unit 300 preferably performs not frictional braking but regenerative braking for enhancement of fuel efficiency. Accordingly, the brake control unit 300 calculates a maximum deceleration of the regenerative braking and then transmits the control signal to the brake. In this step, the main vehicle performs braking in advance before the target vehicle enters the lane of the main vehicle to ensure a safety distance in which the target vehicle may pass through the front of the main vehicle, and as a result, the collision between the vehicles is prevented and the fuel efficiency is enhanced by the regenerative braking of the main vehicle.

Meanwhile, when it is determined that the target vehicle passes the rear of the main vehicle, it is not necessary to perform braking of the main vehicle.

Referring to FIG. 2, next, a step of determining whether the target vehicle is entering the lane of the main vehicle is performed (S30). In this case, the main vehicle determines whether the target vehicle enters the front or the rear of the main vehicle.

A time of determining whether the target vehicle is entering the lane of the main vehicle is a moment when the target vehicle is located in a preset predetermined area P. Referring to FIGS. 3 and 4, here, the predetermined area P is an area set based on a boundary traffic line between the lane C of the main vehicle and the neighboring lane B thereto. In FIG. 4, a process (1'-2'-3') in which the target vehicle changes the lane from driving lane A to the predetermined area P is illustrated. In this case, the autonomous driving control unit 100 may confirm that the target vehicle is located in the predetermined area P by using the sensor mounted on the main vehicle, the IoT, the V2V, etc.

If the target vehicle is entering the front of the main vehicle, it is necessary to ensure a sufficient distance so that the target vehicle passes the lane of the main vehicle. Here, if there is the front vehicle in the front of the main vehicle, a sufficient safety distance between the main vehicle and the front vehicle is required and if there is the rear vehicle in the rear of the main vehicle, the sufficient safety distance between the main vehicle and the rear vehicle is required. In this case, the autonomous driving control unit 100 requests the acceleration to the front vehicle of the main vehicle by using the V2V technology and requests the deceleration to the rear vehicle to ensure the safety distance.

When the target vehicle enters the lane of the main vehicle, the safety distance between the main vehicle and the target vehicle is also required, and as a result, the main vehicle needs to be decelerated. Here, a degree of a deceleration size of the main vehicle may vary depending on a steering amount size of the target vehicle. For example, when the target vehicle moves to the target lane, as the number of times of changing the lane is larger, a larger steering amount is required, and as a result, a deceleration degree of the main vehicle is large. Accordingly, the following step is performed.

Referring to FIG. 2, next, when the target vehicle is entering the front of the main vehicle, a step of calculating the steering amount size of the target vehicle is performed (S40). The autonomous driving control unit 100 calculates the steering amount size of the target vehicle at the time when the target vehicle is located in the predetermined area P. The steering amount size is inversely proportionate to a crossroad passing enabling time of the target vehicle and proportionate to the number of times of changing the lane of the target vehicle. Here, the crossroad passing enabling time of the target vehicle is inversely proportionate to the speed of the target vehicle and proportionate to a distance d up to the target vehicle and the crossroad located in the predetermined area P. In this case, a spare time may be added to the crossroad passing enabling time of the target vehicle for safety. The number of times of the lane change of the target vehicle is the number of lanes in which the target vehicle located in the predetermined area P should change up to the target lane.

Referring to FIG. 2, next, a step of decelerating the main vehicle according to the steering amount size of the target vehicle is performed (S50).

When the steering amount size of the target vehicle is calculated, the autonomous driving control unit 100 compares the steering amount size and a preset reference steering amount. The reference steering amount is a reference for determining whether the target vehicle is suddenly steered. Here, a case where the steering amount size is larger than the reference steering amount means that the target vehicle is suddenly steered and a case where the steering amount size is smaller than the reference steering amount means that the target vehicle is not suddenly steered. In the case where the target vehicle is suddenly steered, the deceleration size of the main vehicle should be accordingly increased and in the case where the target vehicle is not suddenly steered, the deceleration size of the main vehicle should be accordingly decreased.

In the case where the target vehicle is suddenly steered, the autonomous driving control unit 100 transmits the control signal to the brake control unit 300 so as to perform both the frictional braking and the regenerative braking in order to set the size of the deceleration of the main vehicle to a predetermined level or more. On the contrary, in the case where the target vehicle is not suddenly steered, the autonomous driving control unit 100 transmits the control signal to the brake control unit 300 so as to perform only the regenerative braking in order to set the size of the deceleration of the main vehicle to a predetermined level or less. Here, in some forms of the present disclosure, in the case where the target vehicle is not suddenly steered, only the regenerative braking is performed, and as a result, an effect of the enhancement of the fuel efficiency is generated.

Meanwhile, if the target vehicle is entering the rear of the main vehicle, it is necessary to ensure the sufficient distance so that the target vehicle passes the lane of the main vehicle. Here, if there is the front vehicle in the front of the main vehicle, the sufficient safety distance between the main vehicle and the front vehicle is required and if there is the rear vehicle in the rear of the main vehicle, the sufficient safety distance between the main vehicle and the rear vehicle is required. In this case, the autonomous driving control unit 100 requests the acceleration to the front vehicle of the main vehicle by using the V2V technology and requests the deceleration to the rear vehicle to ensure the safety distance. However, since the target vehicle passes the rear of the main vehicle, the step of controlling the deceleration of the main vehicle according to the steering amount size of the target vehicle is not performed.

Figure 5A:
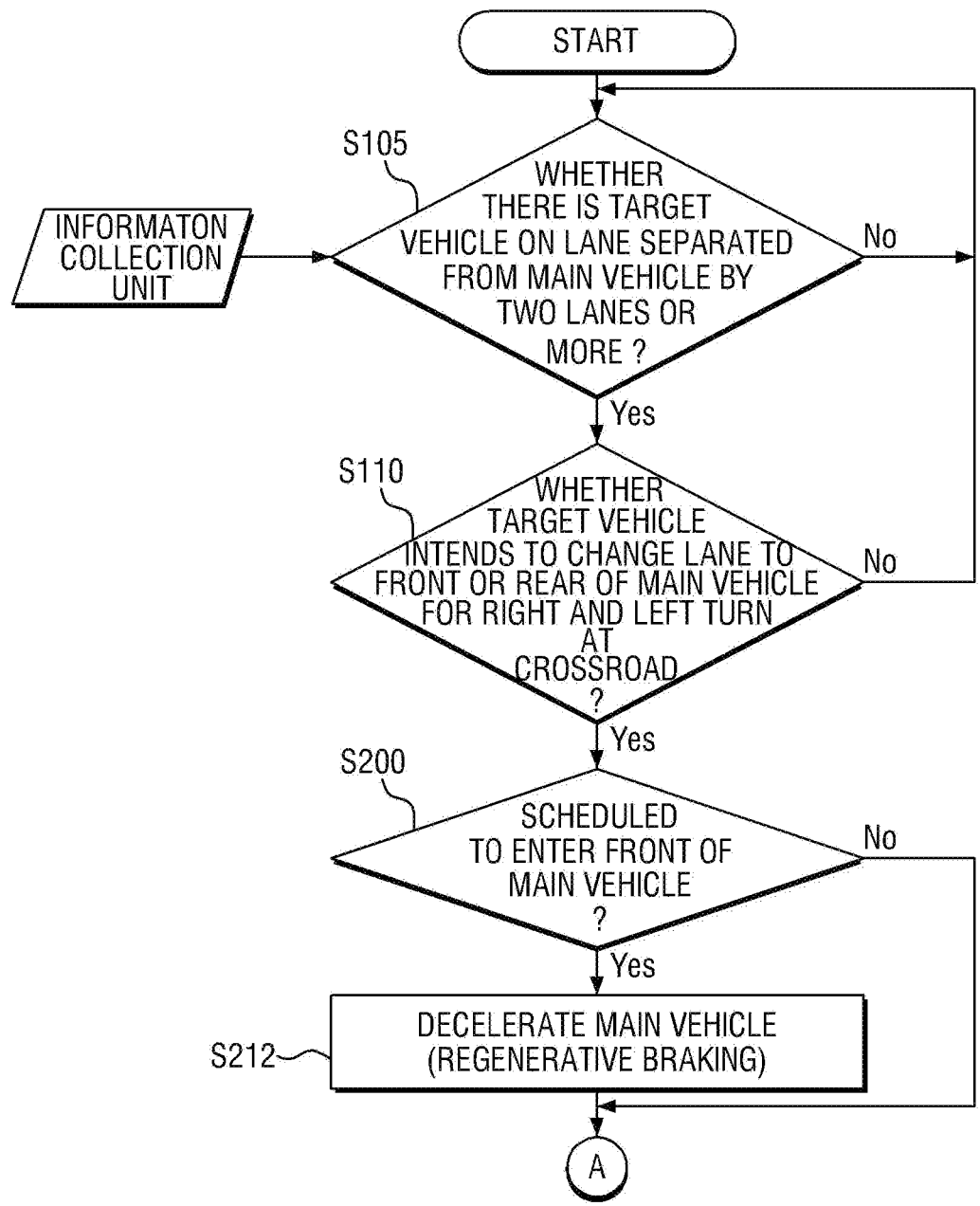
FIGS. 5A and 5B are flowcharts showing a process of a vehicle control method of an autonomous vehicle for a right and left turn at the crossroad in one form of the present disclosure.
Figure 5B:
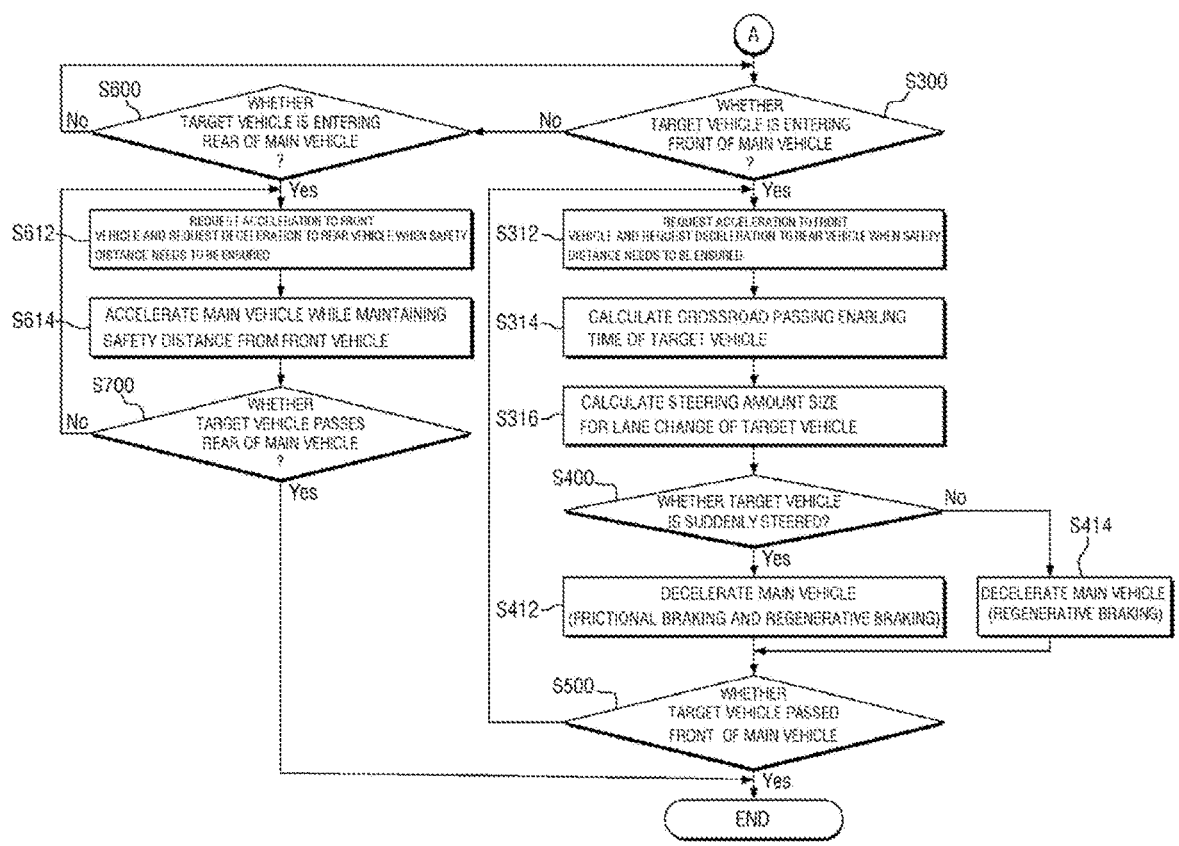

FIGS. 5A and 5B are flowcharts showing a process of a vehicle control method of an autonomous vehicle for a right and left turn at the crossroad in some forms of the present disclosure.

Hereinafter, the vehicle control method of an autonomous vehicle for a right and left turn at the crossroad in some forms of the present disclosure will be described with reference to FIGS. 5A and 5B.

First, it is determined whether there is the target vehicle on the lane separated from the main vehicle by two lanes or more based on the information collected by the information collection unit 400 (S105). If there is the target vehicle, it is determined whether the target vehicle intends to change the lane up to the target lane while passing the front or the rear of the main vehicle for the right and left turn at the crossroad (S110). If there is no target vehicle or no lane change intention, the control method in some forms of the present disclosure is not performed.

When the target vehicle intends to change the lane, the main vehicle determines whether the target vehicle is scheduled to enter the front of the main vehicle (S200). When the target vehicle is scheduled to enter the front of the main vehicle, the main vehicle decelerates itself by performing the regenerative braking in advance (S212).

Thereafter, the main vehicle determines whether the target vehicle is entering the front of the main vehicle (S300). If the target vehicle is entering the front of the main vehicle, when the safety distance needs to be ensured, the acceleration is requested to the front vehicle and the deceleration is requested to the rear vehicle (S312). In this case, the main vehicle calculates the crossroad passing enabling time and the steering amount size of the target vehicle (S314 and S316) to determine whether the target vehicle is suddenly steered (S400). In the case where the target vehicle is suddenly steered, the main vehicle performs both the frictional braking and the regenerative braking (S412) and in the case where the target vehicle is not suddenly steered, the main vehicle performs only the regenerative braking (S414). Thereafter, the main vehicle determines whether the target vehicle passes the front of the main vehicle through the information of the information collection unit 400 (S500). When the target vehicle passes the front of the main vehicle, the control in some forms of the present disclosure is terminated and when the target vehicle does not pass through the front of the main vehicle, a control process for ensuring the safety distance is continuously performed.

Meanwhile, if the target vehicle is not entering the front of the main vehicle, the main vehicle determines whether the target vehicle is entering the rear of the main vehicle (S600).

If the target vehicle is entering the rear of the main vehicle, when the safety distance needs to be ensured, the acceleration is requested to the front vehicle and the deceleration is requested to the rear vehicle (S612). Thereafter, the main vehicle determines whether the target vehicle passes the rear of the main vehicle through the information of the information collection unit 400 (S700). When the target vehicle passes the rear of the main vehicle, the control in some forms of the present disclosure is terminated and when the target vehicle does not pass through the rear of the main vehicle, the control process for ensuring the safety distance is continuously performed.

While the present disclosure has been described by limited exemplary embodiments and drawings, it is to be understood that the present disclosure is not limited thereto and various modifications and changes can be made within the technical spirit of the present disclosure and equivalent ranges to claims to be described below by those skilled in the art.

What is claimed is:

1. A vehicle control method, comprising:
    determining whether a second vehicle intends a lane crossing which will cross in the front or in the rear of a first vehichle to facilitate moving to a target lane for a right and left turn at a crossroad, wherein the second vehicle is travelling separated from a first lane of the first vehicle by at least two lanes;
    determining if the second vehicle intends to cross in front of the first vehicle during the lane change and if so, controlling the first vehicle to decelerate upon said determination;
    determining whether the second vehicle is entering the first lane toward the front or the rear of the first vehicle;
    calculating the time needed for the second vehicle to cross the first lane when it is determined that the second vehicle is entering the first lane in front of the first vehicle; and
    controlling the first vehicle to decelerate according to the calculated time.

2. The vehicle control method of claim 1, wherein determining whether the second vehicle is entering the first lane comprises:
    collecting, by the first vehicle, lane change intention information of the second vehicle through V2V communication with the second vehicle.

3. The vehicle control method of claim 1, wherein controlling the first vehicle to decelerate when it is determined that the second vehicle intends to change the lane while passing the front of the first vehicle comprises:
    performing a regenerative braking when the first vehicle is decelerated.

4. The vehicle control method of claim 1, wherein determining whether the second vehicle is entering the first lane comprises:
    determining whether the second vehicle is entering the first lane toward the front or the rear of the first vehicle when the second vehicle enters a preset predetermined area (P) based on a boundary traffic line between the first lane and a neighboring lane.

5. The vehicle control method of claim 1, further comprising:
    when it is determined that the second vehicle is entering the first lane toward the front or the rear of the first vehicle, requesting, by the first vehicle, a speed change to a front vehicle or a rear vehicle of the first vehicle to pass through the first lane through the V2V communication.

6. The vehicle control method of claim 5, wherein requesting the speed change comprises:
   requesting, by the first vehicle, acceleration to the front vehicle; and
   requesting, by the first vehicle, deceleration to the rear vehicle.

7. The vehicle control method of claim 1, wherein calculating the size of the steering amount of the second vehicle comprises:
   calculating the steering amount by a first calculation equation in which the steering amount is inversely proportionate to a passing enabling time up to the crossroad from a current position of the second vehicle and proportionate to the number of lane change times up to the target lane from a current lane of the second vehicle.

8. The vehicle control method of claim 7, wherein calculating the size of the steering amount comprises:
   calculating the passing enabling time by a second calculation equation in which the passing enabling time is inversely proportionate to a current speed of the second vehicle and proportionate to a distance up to the crossroad from the current position of the second vehicle.

9. The vehicle control method of claim 8, wherein calculating the passing enabling time comprises:
   adding a preset spare time to the second calculation equation for collision prevention.

10. The vehicle control method of claim 1, wherein controlling the first vehicle to decelerate according to the size of the steering amount comprises:
    when the steering amount is greater than a preset reference steering amount, performing both a frictional braking and a regenerative braking.

11. The vehicle control method of claim 1, wherein controlling the first vehicle to decelerate according to the size of the steering amount comprises:
    when the steering amount is less than a preset reference steering amount, performing a regenerative braking only.

* * * * *